(12) United States Patent
Malitzis et al.

(10) Patent No.: US 7,359,877 B2
(45) Date of Patent: Apr. 15, 2008

(54) ODD LOT PROCESSING IN CENTRALIZED AUTOMATED MARKET SYSTEM

(75) Inventors: John Malitzis, Washington, DC (US); Peter Martyn, Ridgewood, NJ (US); Daniel Franks, Trumbull, CT (US); Debra Peter, Newfoundland, NJ (US); Patricia Dizenhaus, Manalapan, NJ (US); Thomas Moran, Arlington, VA (US); Gene Lopez, Arlington, VA (US)

(73) Assignee: The Nasdaq Stock Market, Inc., Rockville, MD (US)

( * ) Notice: Subject to any disclaimer, the term of this patent is extended or adjusted under 35 U.S.C. 154(b) by 1029 days.

(21) Appl. No.: 09/812,225

(22) Filed: Mar. 19, 2001

(65) Prior Publication Data

US 2002/0133454 A1    Sep. 19, 2002

(51) Int. Cl.
*G06Q 40/00* (2006.01)

(52) U.S. Cl. .............................. 705/37; 705/35; 705/38; 705/40

(58) Field of Classification Search ........... 705/35–356
See application file for complete search history.

(56) References Cited

U.S. PATENT DOCUMENTS

| | | | |
|---|---|---|---|
| 6,035,287 A | 3/2000 | Stallaert et al. | |
| 6,195,647 B1 | 2/2001 | Martyn et al. | |
| 6,278,983 B1 | 8/2001 | Ball | |
| 7,181,424 B1 | 2/2007 | Ketchum et al. | |
| 7,209,896 B1 | 4/2007 | Serkin et al. | |
| 2002/0023043 A1* | 2/2002 | Samukawa et al. | 705/37 |
| 2002/0161687 A1* | 10/2002 | Serkin et al. | 705/37 |
| 2003/0093359 A1 | 5/2003 | Martyn et al. | |

OTHER PUBLICATIONS

Tewels et al, The Stock Market, 1998, John Wiley & Sons, pp. 168-169.*
U.S. Appl. No. 09/401,875, filed Sep. 23, 1999.
U.S. Appl. No. 09/404,517, filed Sep. 23, 1999.
U.S. Appl. No. 09/401,873, filed Sep. 23, 1999.

* cited by examiner

*Primary Examiner*—Kambiz Abdi
*Assistant Examiner*—Timothy M Harbeck
(74) *Attorney, Agent, or Firm*—Fish & Richardson P.C.

(57) ABSTRACT

An electronic market for trading of securities includes a plurality of client stations for entering quotes for securities and a server process. The market has a facility, which receives quotes from the clients, aggregates the quotes and causes a total of all aggregated quotes to be displayed for a plurality of price levels on the client systems. The market uses a graphical user that depicts aggregated quotes in an aggregate window, and a plurality of price levels of a product traded in the market. The market also includes processes to handle odd-lot processing and provides a central quote/order collector that interfaces to disparate order delivery systems to minimize dual liability of market makers.

30 Claims, 9 Drawing Sheets

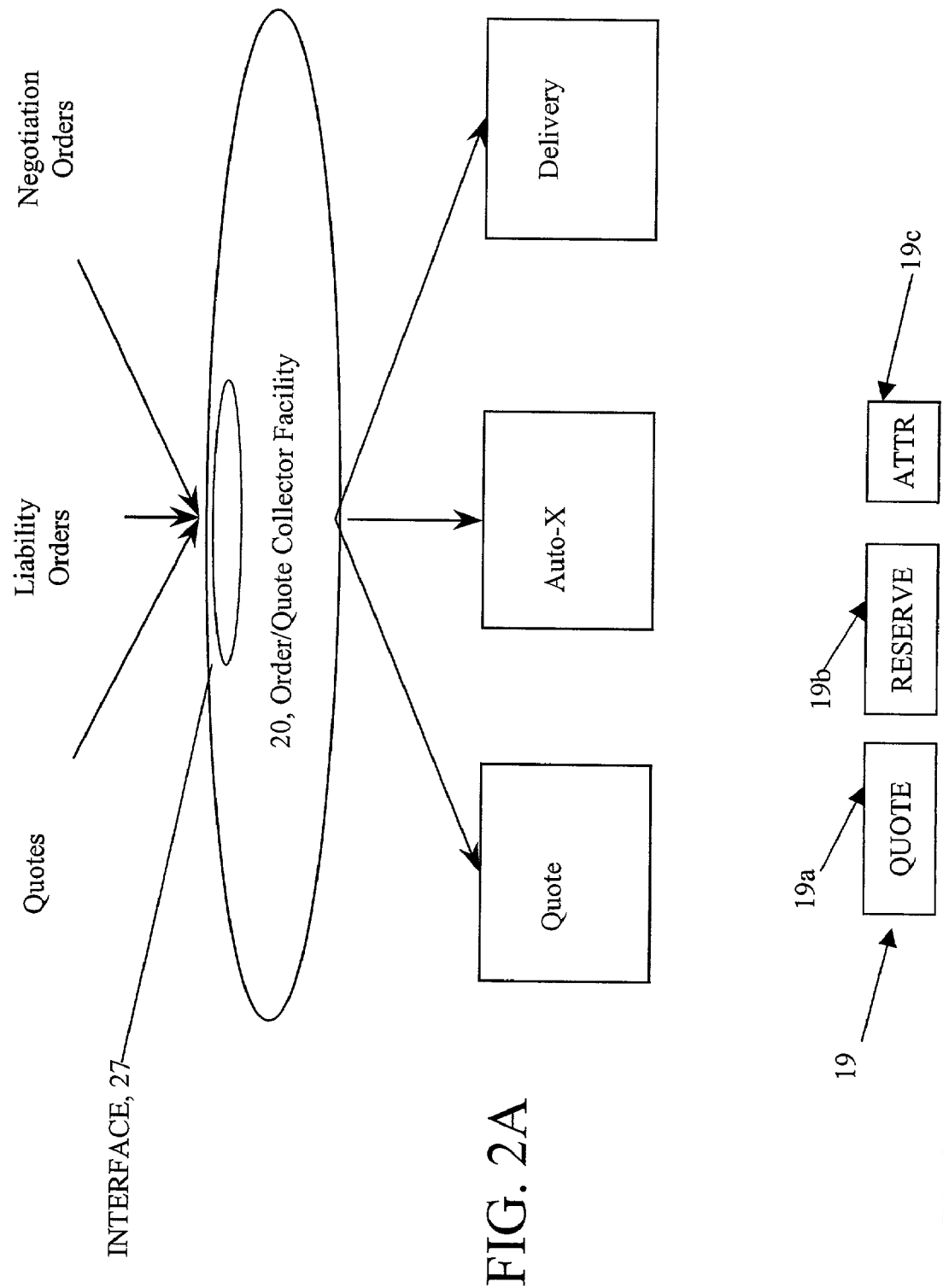

ODD LOT PROCESSING IN CENTRALIZED AUTOMATED MARKET SYSTEM

BACKGROUND

This invention relates to trading systems particularly financial trading systems.

Electronic equity markets, such as The Nasdaq Stock Market® collect, aggregate, display pre-trade information to market participants. Electronic equity markets also provide trading platforms through which market participants may access liquidity indicated in the marketplace. In some types of markets customer orders are entered by broker/dealers or equivalents and traded against other orders or quotes that are displayed by market makers or electronic commerce networks (ECN's). Sometimes orders are for what is commonly referred to as an odd lot, e.g., an order that is not a multiple of 100 shares.

One type of trading platform is the Small Order Execution System (SOES$^{SM}$). The Small Order Execution System can be used to access, e.g., market makers quotes, via automatic execution if the order is for a public customer and meets a maximum order size requirement. Conventionally, in systems such as the Small Order Execution System (SOES$^{SM}$) odd lots are processed against only those market makers who are at the inside bid or offer, in round-robin fashion. An odd-lot execution does not decrement or decrease a market maker's quote by the amount of the execution.

SUMMARY

According to an aspect of the present invention, a A method for trading odd-lots of a security in an electronic market for trading securities includes determining whether an odd-lot exposure limit has been exceeded for a market participant and routing a received odd-lot order for execution or delivery to a market participant whose odd-lot exposure limit has not been exceeded and which is sufficient to satisfy execution of the order.

According to an additional aspect of the present invention, an electronic market for trading securities, includes an order execution/routing manager that executes non-directed orders against quoting market participant's quotes/orders based on a priority and a process to determine whether an order is a mixed order or an odd lot order. The market also includes an odd-lot execution process that executes the odd-lot portion of the mixed order or the odd-lot order. The odd-lot process includes a process to determine whether an odd-lot exposure limit has been exceeded for a market participant and a process to route a received odd-lot order for execution or delivery to a market participant whose odd-lot exposure limit has not been exceeded and which is sufficient to satisfy execution of the order.

According to an additional aspect of the present invention, a computer program product residing on a computer readable medium for trading securities in an electronic market, includes instructions for causing a computer to, determine whether a received order is a mixed order or an odd lot order and retrieve an odd-lot exposure limit for a next quoting market participant. The instructions determine whether the odd-lot exposure limit has been exceeded for a market participant, and routes a received odd-lot order for execution or delivery to a market participant whose odd-lot exposure limit has not been exceeded and which is sufficient to satisfy execution of the order.

One or more of the following advantages may be provided by one or more aspects of the present invention.

In general, a market maker can and will maintain different exposure limits for each security that it makes a market in. The exposure limit can be set by the market maker. The odd-lot execution manager does not execute an odd-lot order against a market maker unless the market maker had a sufficient exposure limit to fill the odd-lot order. Despite the potential for odd-lot processing in a security to suspend if no market maker establishes an exposure limit, it is likely that competitive forces to capture and service this segment of the market will yield swift and robust processing of odd-lot transactions.

BRIEF DESCRIPTION OF THE DRAWINGS

FIG. 1A is a diagram showing a format for quotes.

FIG. 2A is a block diagram showing arrangement of an quote/order collector facility.

DESCRIPTION

Figure 1:
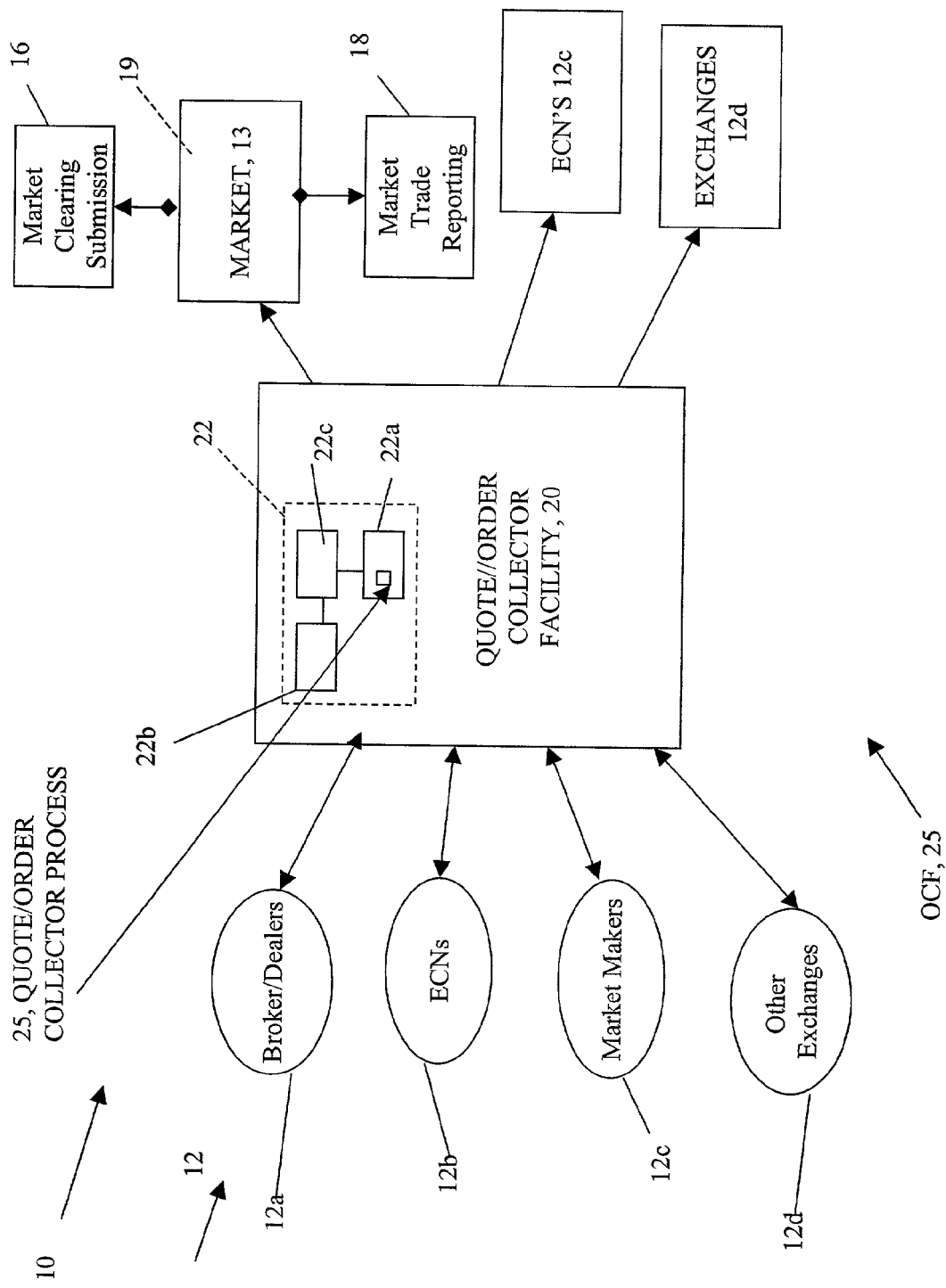
FIG. 1 is a block diagram of a market system.

Referring to FIG. 1, an electronic market 10 is shown. The electronic market 10 includes client systems 12 that access a central quote/order collector facility 20. The client systems 12 can be broker/dealer systems 12a, electronic communication networks (ECN's) 12b, market-marker systems 12c, and other exchanges 12d. The connections can use existing Nasdaq protocols such as SelectNet®, Small Order Execution System$^{SM}$ (SOES$^{SM}$), and so forth. The client systems 12 include a processor, memory and a storage device, e.g., a client workstation or personal computer (all not shown) that can include a client process to enter quotes/orders into the electronic market system. The quote/order collector facility 20 causes the order execution or order delivery systems (e.g., SOES$^{SM}$ and SelectNet®) to deliver executions or orders to a market that is coupled to a clearing system 16 and a reporting system 18. It also causes delivery of executions or routing of orders to the ECN's 12c, depending on the status of the ECN, and routing of orders or executions to other markets and exchanges 12d. The quote/order collector facility 20 is comprised of one or preferably a plurality of server computers generally denoted as 22 including a processor 22a, main memory 22b and storage 22c. The storage system 22c includes quote/order collector process 25 that is executed in memory 22b. In general, server 22 is a complex computer server, the details of which are not important to an understanding of the present invention.

The quote/order collector facility 25 collects pre-trade information in the form of quotes or orders. The distinction between a quote and an order depends on several factors. For example, each a market maker can send a proprietary quote i.e., a quote that represents its own trading interest or an agency quote that represents trading interest of a sponsored entity. If one proprietary quote is sent it could be considered one order. If one agency quote is sent it also could be considered one order. If an agency quote reflects an aggregation of more than one agency order, however, the aggregate agency order could be considered a quote. Entering quotes are limited to registered market makers 12b and ECNs 12c and possible UTP Exchanges 12d. For any given stock, a registered market maker or ECN may directly enter a non-marketable order i.e., quote into the system 20 on behalf of its own account or for the account of a customer, or it may sponsor the direct entry of an order by its customer. All sponsored quotes are sent to the quote/order collector facility 20 under the name of the sponsoring market maker or ECN. Every registered market maker or ECN will be permitted to submit an unlimited number of non-marketable quotes to the system 20.

As shown in FIG. 1A, each quote 19 submitted to the system can include a display quote size 19a, a reserve size 19b and an indication 19c (ATTR) of whether the quote size is attributable or non-attributable. Quote size 19a when attributable based on indicator 19c, is directly attributable to the market maker or ECN, and is placed next to its unique market participant ID, and is displayed in a "current quote" montage. Quote size 19b when non-attributable is sized that the market maker or ECN wishes to display to the marketplace through an aggregate montage of the order display window. This quote size 19a is not attributable to the market maker or ECN until it is executed. Reserve size 19b is liquidity that is not displayed to the marketplace but that is immediately accessible through the quote/order collector facility 20. In order to use reserve size 19b, a market maker can be required to have a minimum amount displayed in the aggregate quote size 19a without or with attributable indicator 19c and negotiation quote with attributable indicator 19c asserted.

A broker/dealer can receive an order from a customer. The broker/dealer can send that order to the order collector facility 20 to be executed with quotes that are posted by electronic communication networks, market makers or other markets. In this embodiment, orders of broker/dealers are not posted as quotes.

Order Collector Facility

Referring to FIG. 2A, the quote/order collector facility 20 receives quotes, liability orders, (non-liability orders) and directed orders from market participants. The quote/order collector facility 20 allows a quote/order to be displayed in the market, and also allows for marketable orders to be executed or routed to market participants.

The order quote collector facility 20 also includes an interface 21 that couples the order collector facility 20 to a plurality of order delivery systems. For example, the interface 21 can couple the order quote collector facility 20 to an order execution system, e.g., the Small Order Execution System$^{SM}$ (SOES$^{SM}$) and to a negotiation system, e.g., SelectNet®. The interface 21 would provide access to information contained in order flow delivered via the delivery systems to a quote/order collection process 25 described in conjunction with FIG. 2B. In general, the electrical and logical functions which comprise the interface 21 can be similar to the ones currently existing in the SOES$^{SM}$/SelectNet® systems. The interface 21 or the process 25 would extract information from the quotes and make that information available to the quote order collector process 25. The quote/order collector process 25 extracts information and process orders in a unified manner to allow the order collector system 20 to be a unifying point of collection of all orders which are sent to the market 10.

The interface 21 can also be used to route executions of liability orders back to market participants whose quotes/orders were executed against and can deliver orders for negotiation against market participants whose quotes are selected for further negotiation via the SelectNet® system.

Figure 2B:
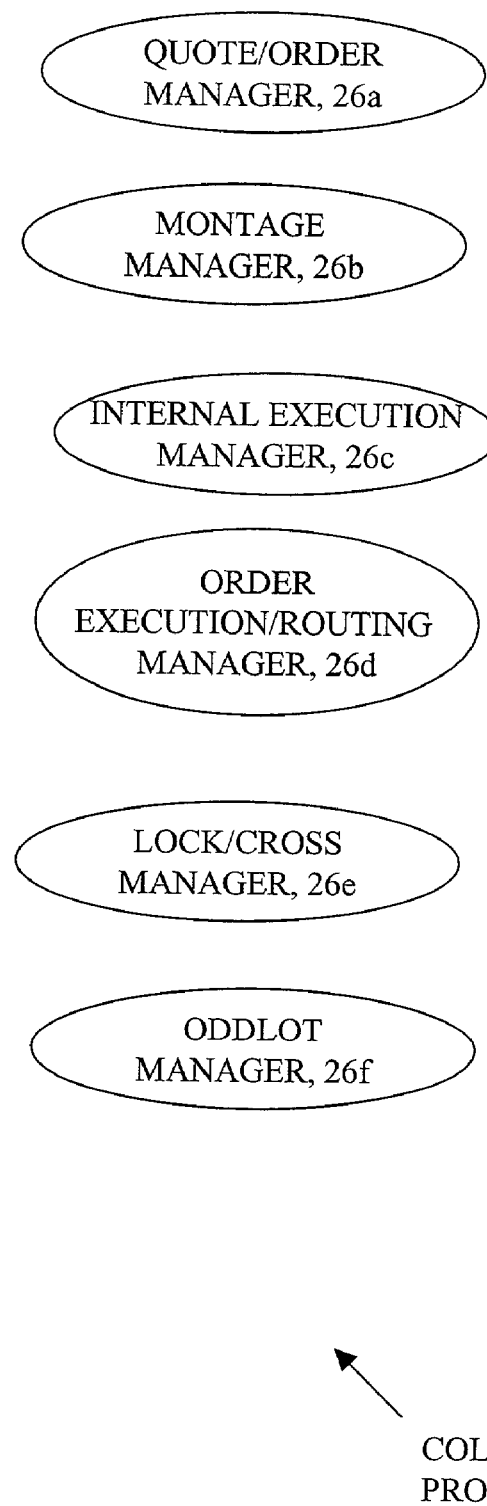
FIG. 2B is a logic view of functions in the quote/order collector facility.

Referring to FIG. 2B, the quote/order collector process ("OCP") 25 is shown. The quote/order collector process 25 provides transmission of multiple orders or quotes at multiple price levels by Quoting Market Participants to a quotation manager 26a. The quote/order manager 26a that provides a unified point of entry of quotes and orders from disparate delivery systems into the quote/order collector facility 20 to access quotes/orders displayed (as either attributable or non-attributable) in both the aggregate montage and current quote montage. The quote/order manager 26a manages multiple quotes/orders and quotes/orders at multiple price levels and uses a montage manager 26b to display (either in the Aggregate montage or in the current quote montage) the orders/quotes consistent with an order's/quote's parameters. The order collector process 25 also includes an internal execution process manager 26c to match off executions for quoting market participants at the best bid/offer. The order collector system 20 also includes an order routing/execution manager 26d provides a single point delivery of executions or routing of orders, which substantially eliminates potential for dual liability. That is, order collector process 25 will maintain the order routing and executions functionality available in the SOES$^{SM}$ and SelectNet® systems. The order collector process 25 also includes a quote update manager 26e, a lock/cross quote manager 26f, and an odd lot execution manager 26g.

Figure 3A:
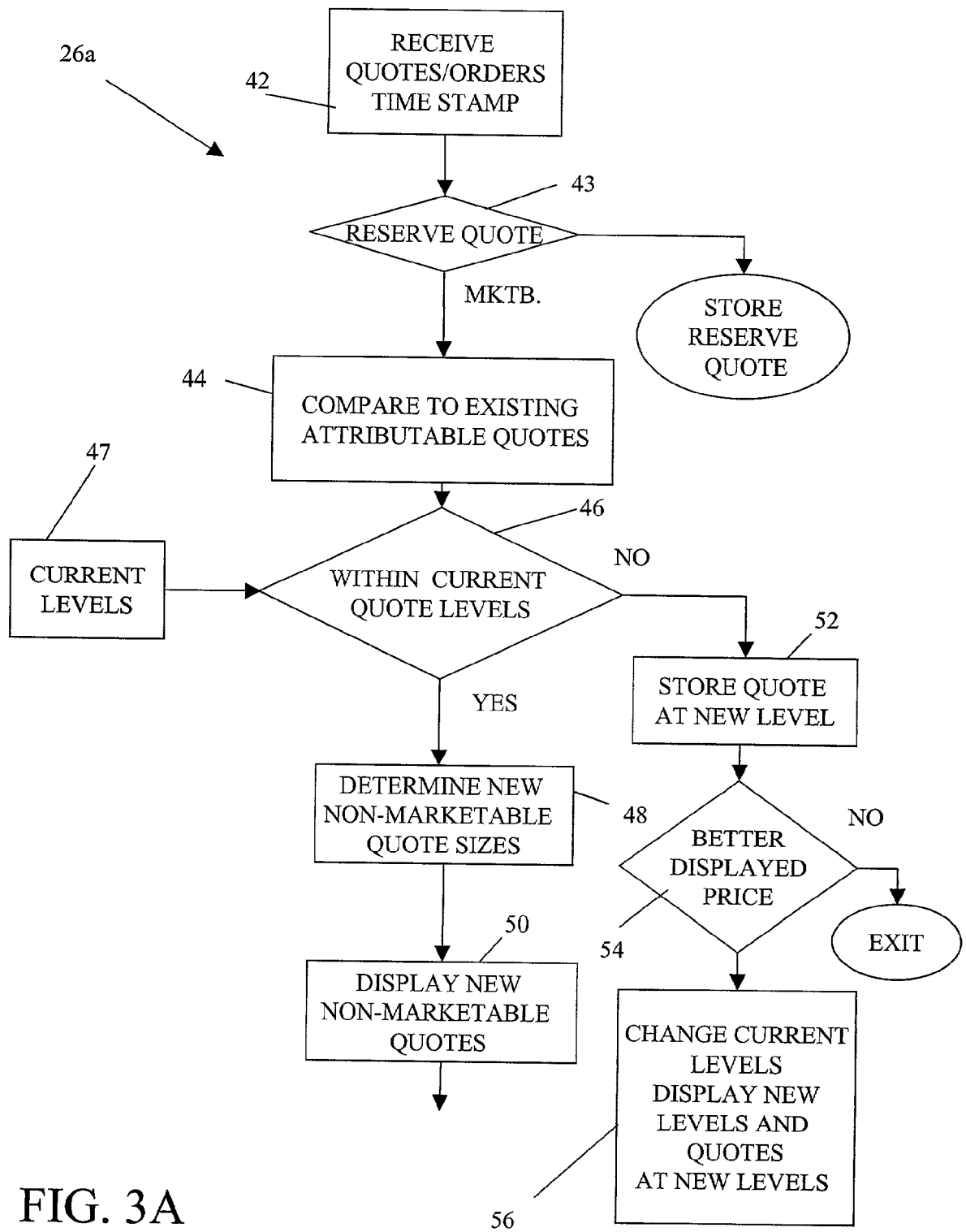
FIG. 3A is a flow chart showing a quote/order manager.

Referring to FIG. 3A, the order collector process 25 receives orders/quotes and time stamps 42 each order/quote upon receipt. This time stamp determines the order's/quote's ranking for interaction with incoming marketable orders. Quotes/orders are designated as either attributable or non-attributable, and could also have a reserve size discussed above. The order collector process 25 aggregates all of a Quoting Market Participant's attributable and non-attributable orders at a particular price level, and disseminates order/quotation information into the aggregate montage and/or the current quote montage, as will be discussed below.

The order entry process 25 determines 43 whether the received quote/order corresponds to a reserve quote. If the quote does not correspond to a reserve quote then the quote is a displayable quote that is attributable or non-attributable. The order entry process 25 compares 44 the received quotes/orders to existing quotes/orders to determine 46 whether the price of quotes/orders fall in existing quote/order price levels. Any number of quote/order price levels can be accommodated although, in this example, only three price levels will be displayable in the non-attributable i.e., aggregate montage. If the quote price is in a displayable price level it is a displayable quote eligible for automated execution. The order collector system 20 can be provided with more price level depth than the three levels, e.g., a depth of 20-25 levels although only a limited number, e.g., three would be displayed at any one time.

If the quote is within one of the pre-defined quote levels, the process 25 determines 48 new non-marketable quote/orders sizes by adding the quote/order size corresponding to the received quote/order to quote sizes at that price level already in the system 20. The process 25 will cause the new non-marketable quote sizes to be displayed 50. If the quote is not within one of the pre-defined quote levels, the process 25 stores 52 the quote at a new price level determines 54 if it is at a better price. If the quote is at a better price, the process 25 changes 56 current levels to cause a new price level for non-marketable quote sizes to be displayed 50.

Figure 3B:
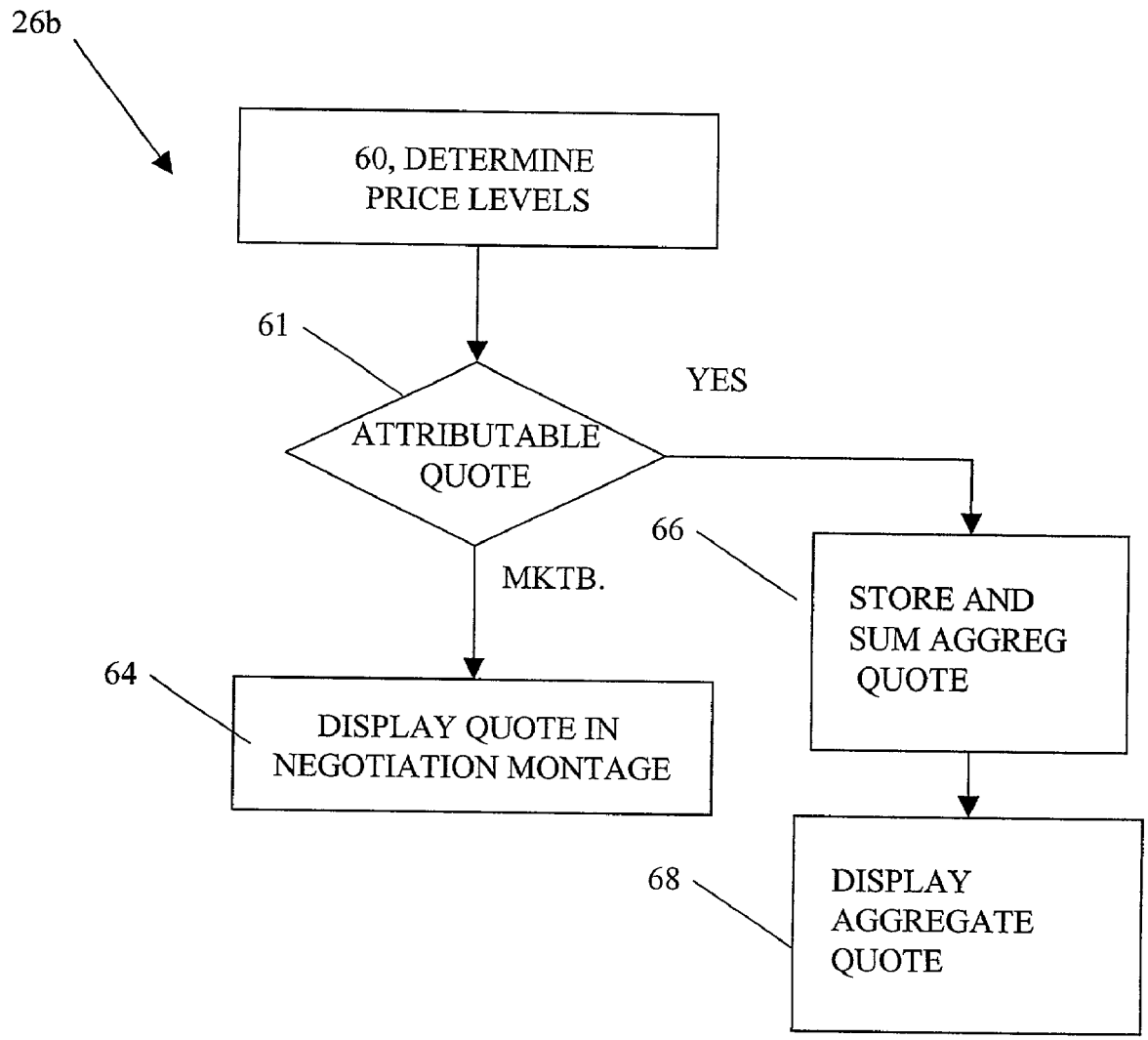
FIG. 3B is a flow chart showing a montage manager.

Referring to FIG. 3B, the montage manager 26b of the quote/order collector process 25 determines 60 which price levels to display 60 and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the three top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one MMID and possibly an agency MMID against which they can display attributable quotes. If a market maker has an agency quote, attributable orders will be displayed once the order or orders at a particular price level become the market participant's best agency quote.

For example, MMA sends system 20 five 1,000 shares attributable buy orders at $20 and two 1,000 share non-attributable buy orders at $20, for a total interest of 7,000 shares to buy at $20. At some point, the $20 price level becomes the best bid. In this example, if MMA is alone at the inside bid, system 20 will aggregate all of the orders in the system and display as follows: 7,000 shares in the Aggregate montage; 5,000 shares (the attributable portion) in the current quote montage next to MMA's MPID; and 2,000 (the non-attributable portion) in a "SIZE" MMID.

Quote/order collector system 20 provides several advantages to the market. One advantage is that it ensures compliance with the regulatory rules such as the SEC Order Handling Rules, and in particular the Limit Order Display Rule and SEC Firm Quote Rule. With system 20 it is less likely that a Quoting Market Participant, because of system delays and or/fast moving markets, will miss a market because the Quoting Market Participant is unable to quickly transmit to System 20 a revised quote (which may represent a limit order).

ECNs do not currently participate in the SOES$^{SM}$ execution system because of the potential for dual liability and assuming proprietary positions. For example, if an ECN matches orders between two subscribers and contemporaneously receives an execution from SOES$^{SM}$ against its quote, the ECN will be required to honor both the internal execution and the SOES$^{SM}$ execution, thus taking on a proprietary position. This issue of liability does not arise in SelectNet® because that system delivers orders which can be declined if the ECN, after scanning its book, determines that the quote was taken out by an internal execution. An ECN cannot decline a SOES$^{SM}$ execution because the system delivers an execution, as opposed to an order.

An ECN, like a market maker, can have the ability to give orders to the system 20. If an internal subscriber wants to access an order in an ECN that is also being displayed in system 20, the ECN can request a cancel before accomplishing the internal match. If the request to cancel is declined because the order was already executed against in system 20, the ECN can decline the internal customer and avoid the potential for dual liability.

The OCF 20 will eliminate virtually all potential for double liability using the disparate execution and delivery systems that exist today because OCF 20 will serve as the single point of order entry and the single point of delivery of all Liability Orders (as well as Non-Liability Orders).

To access quotes in system 20, therefore, order entry firms, market makers, ECNs, or UTP Exchanges, will enter either a directed or non-directed order into the OCF 25. The order may be of any size. The order indicates whether it is a buy, sell, sell short, or sell short exempt. The order is either a priced order or a market order. The system 20 has a separate odd lot process described below.

Nondirected Orders

A market participant can immediately access the best prices in system 20 as displayed in the aggregate montage, by entering a non-directed order into the OCF 25. A non-directed order is an order that is not sent/routed to a particular Quoting Market Participant. A non-directed order is designated as a market order or a marketable limit order and is considered a "Liability Order" and treated as such by the receiving market participant. Additionally, the order entry participant can obtain the status of the order and request a cancel of such order. Further, in some embodiments, the market 10 allows market participants that enter Non-Directed Orders three options as to how the order interacts with the quotes/orders in the system 20. These choices are that the orders can execute against displayed contra side interest in strict price/time; or price/size/time; or price/time that accounts for ECN access fees.

Upon entry, the OCF 25 will ascertain what market participant is the next Quoting Market Participant in queue to receive an order based on the entering MP's ordering choice, and depending on how that receiving Quoting Market Participant participates in system 20 (i.e., automatic execution v. order delivery), the OCF 25 will either cause delivery of an execution (via SOES$^{SM}$) or delivery of a Liability Order (via SelectNet®).

Also in some embodiments, the market 10 can have a class of orders referred to as preferenced orders. A preferenced order is an order that is preference to a particular quoting market participant e.g., market maker or ECN. Preferenced Orders can be of two types price restrictions or no price restrictions. Preferenced Orders of either type are entered into the system 20 through the Non-Directed Order Process. The market participant entering the Preferenced Order designates the quoting market participant by its identification symbol ("MMID"). Preferenced Orders are processed in the same "queue" as Non-Directed Orders and are sent from the queue when the preferenced quoting market participant quote satisfies the order.

For example, if MMA and ECN1 (non-automatic exception participant) are at the inside bid each displaying 1,000 shares at $20, and OE Firm A enters a market order to buy 1,000 shares, assuming that MMA is first in time priority, the OCF 25 will route the order into the SOES$^{SM}$ and deliver an execution of 1,000shares to MMA via the SOES$^{SM}$. If another market order to buy 1,000 shares is entered into the system, the OCF 25 will deliver a Liability Order to ECN1. If ECN1 had opted to take automatic execution, the OCF would have delivered an execution to ECN1 via the SOES$^{SM}$.

Order Execution Manager

Figure 4A:
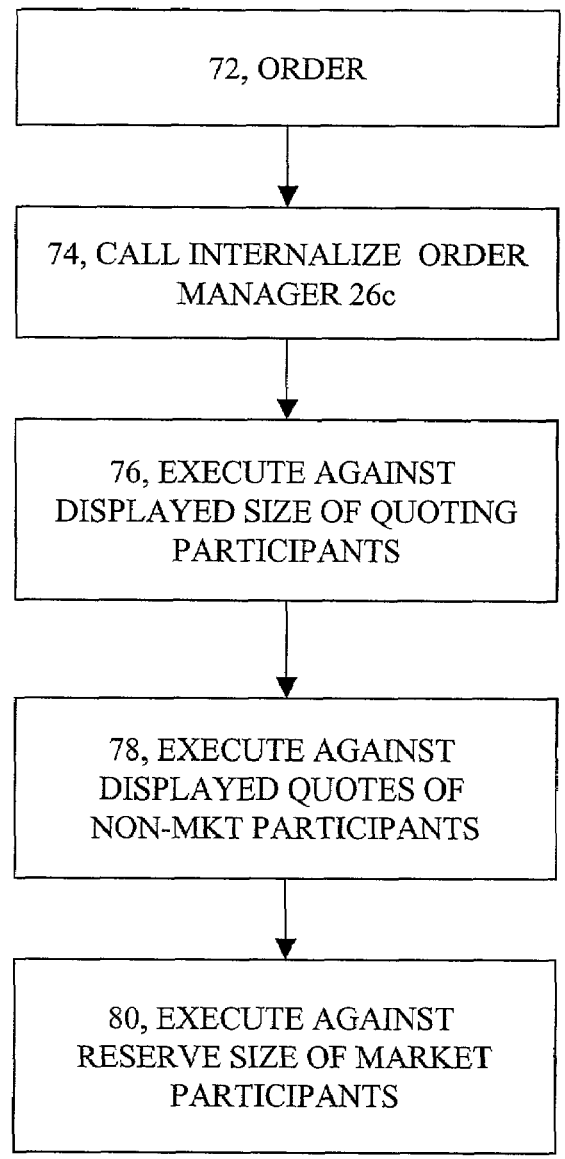
FIGS. 4A-4B are flow charts of an execution/routing manager.

Referring to FIG. 4A, an exemplary order execution/routing manager 26d executes non-directed orders against Quoting Market Participant's quotes/orders based on, e.g, price/time priority. As noted above, other priorities can be used and the execution/routing manager 26d would be so modified. Each quote/order when entered into the OCF 25 receives a time stamp. The order execution/routing manager 26d will deliver all orders at the best bid/best offer generally in strict time priority based on the time stamp of the order/quote, subject to the order execution choice preferencing features, and self matching feature, with the exception that order execution/routing manager 26*d* will first attempt to provide a match off of orders/quotes entered by a Quoting Market Participant if the participant is at the best bid/best offer by calling 74 an internal execution manager 26*c*. Thus, the order execution/routing manager 26*d* will call the internal order execution manager 26*c* to try to match off a Quoting Market Participant's orders and quotes that are in the system if the participant is at the BBO and receives a market or marketable limit order on the other size of the market.

Generally, the order execution/routing manager 26*d* will attempt to execute 76 against all displayed size (attributable and non-attributable) at a particular price level for market participants such as market makers and ECN's. There does not need to be an interval delay between the delivery of executions against a market maker's quote (assuming the market maker has size to access) because all Quoting Market Participants may quote their actual size and may give multiple orders and price levels. As shown herein the market maker proprietary orders receive preference over agency orders. However, preference could be given to agency orders before market maker orders.

Once displayed size in system 20 is exhausted, the order execution/routing manager 26*d* will attempt to access the quotes of UTP Exchanges. After accessing the displayed size of Quoting Market Participants and UTP Exchanges 78, order execution/routing manager 26*d* will attempt to execute 80 against the reserve size of Quoting Market Participants generally in price/time priority, subject to the exceptions noted above.

In an alternate embodiment, the order execution/routing manager 26*d* can distinguish between exchanges that support auto execution and exchanges that do not support auto execution giving preference for the former. Additionally, in such an embodiment, UTP exchanges can have reserve size and the system 20 can distinguish between exchanges that support auto execution and those ECN's, and then exchanges that do not support auto execution.

In another embodiment the order execution/routing manager 26*d* can first access quotes of market makers and auto-execution ECN's, next access quotes of market makers and ECN's for delivery of orders, then the reserve size of market makers and ECN's and UTP exchanges. Other arrangements priorities, etc. are possible taking into consideration how participants participate in the market 10, choices of how orders interact in the market 10, the system or customer choices.

Figure 4B:
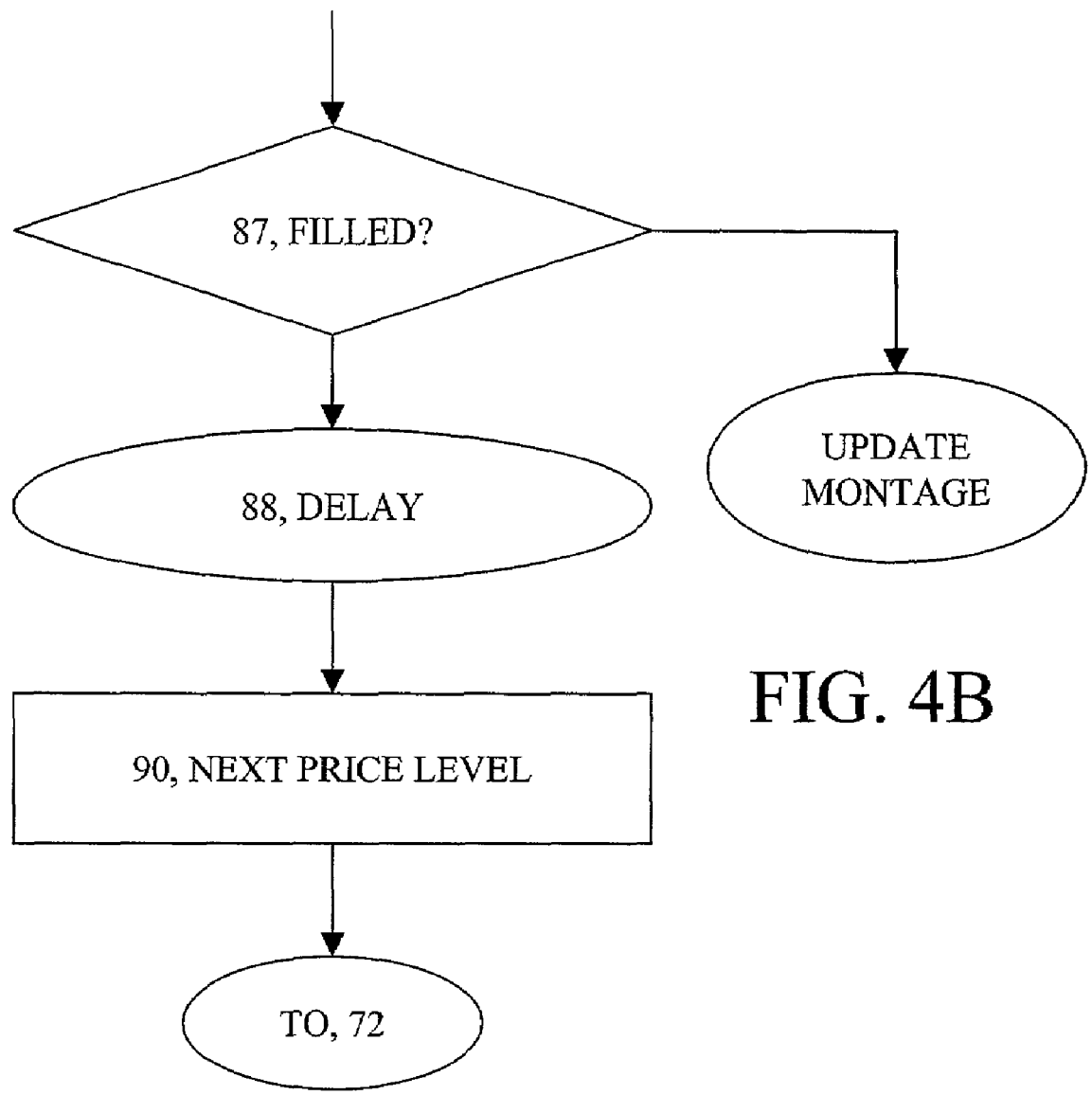

Referring to FIG. 4B, if the order is not filled 88, the order execution/routing manager 26*d* will move 90 to the next price level, immediately in one embodiment, or in another embodiment, after a predefined delay, e.g., a 5 second interval delay 87 before attempting to execute an order at the new price level. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility.

For non-directed orders that are mixed orders or odd lot orders the collector facility process 25 (FIG. 2B) calls an odd-lot execution manager 26*f*.

Odd-Lot Processing

Figure 5A:
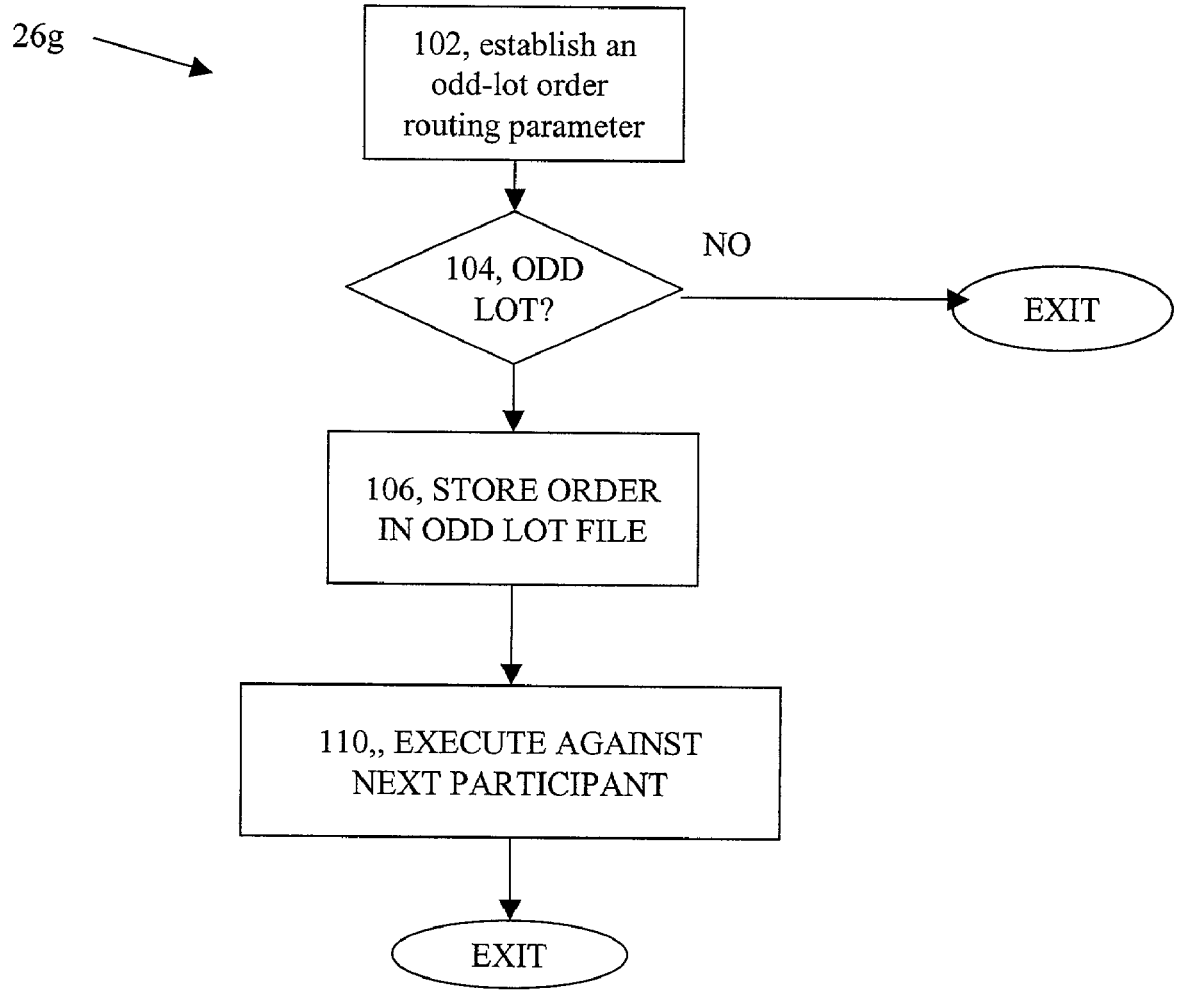
FIGS. 5A and 5B are flow charts showing an odd lot execution manager.

Referring to FIG. 5A, an odd lot execution manager 26*g* is shown. The odd lot execution manager 26*g* accepts and executes orders that are for less than one normal unit of trading, i.e., odd-lot orders or orders less than one round lot (e.g., 100 shares for equities). The odd lot execution manager 26*g* is a separate mechanism for processing and executing these orders as distinct from normal units of trading. Odd lot execution manager 26*g* establishes 102 an odd-lot order routing parameter of a predetermined number of orders, e.g., one order per second, per firm. In one embodiment, the odd lot execution manager 26*g* accepts 104 an order per market participant that is at a rate set by the odd-lot order routing parameter 102. The odd-lot execution manager 26*g* receives and holds 106 odd-lot orders in a separate file and automatically executes 110 such odd-lots against market makers, as described below.

For example, if a market participant enters a market order for 50 shares into the system, odd lot execution manager 26*g* will immediately and automatically call the odd lot process 110 to execute the order. Executions can be at the inside price against the market maker that is next in rotation, and which has an odd-lot exposure limit the market maker wishes to trade, via the odd-lot process and that can satisfy the order. Executions occur when the odd-lot order becomes marketable, i.e., when the best price in the system moves to the price of the odd-lot limit order. The odd-lot execution manager 26*g* will not decrease the market maker's displayed quote size, rather it will decrease the market maker's odd-lot exposure limit.

The odd-lot execution manager 26*g* accesses the "odd-lot exposure limit" parameter that is maintained for market makers. The odd-lot execution manager 26*g* also accesses and maintains a market maker interval delay between odd-lot executions against the same market maker. Odd-lots are processed in a round-robin fashion against a market maker even if it is not at the inside, odd-lots are processed only against those market makers who have an available odd-lot exposure limit.

Figure 5B:
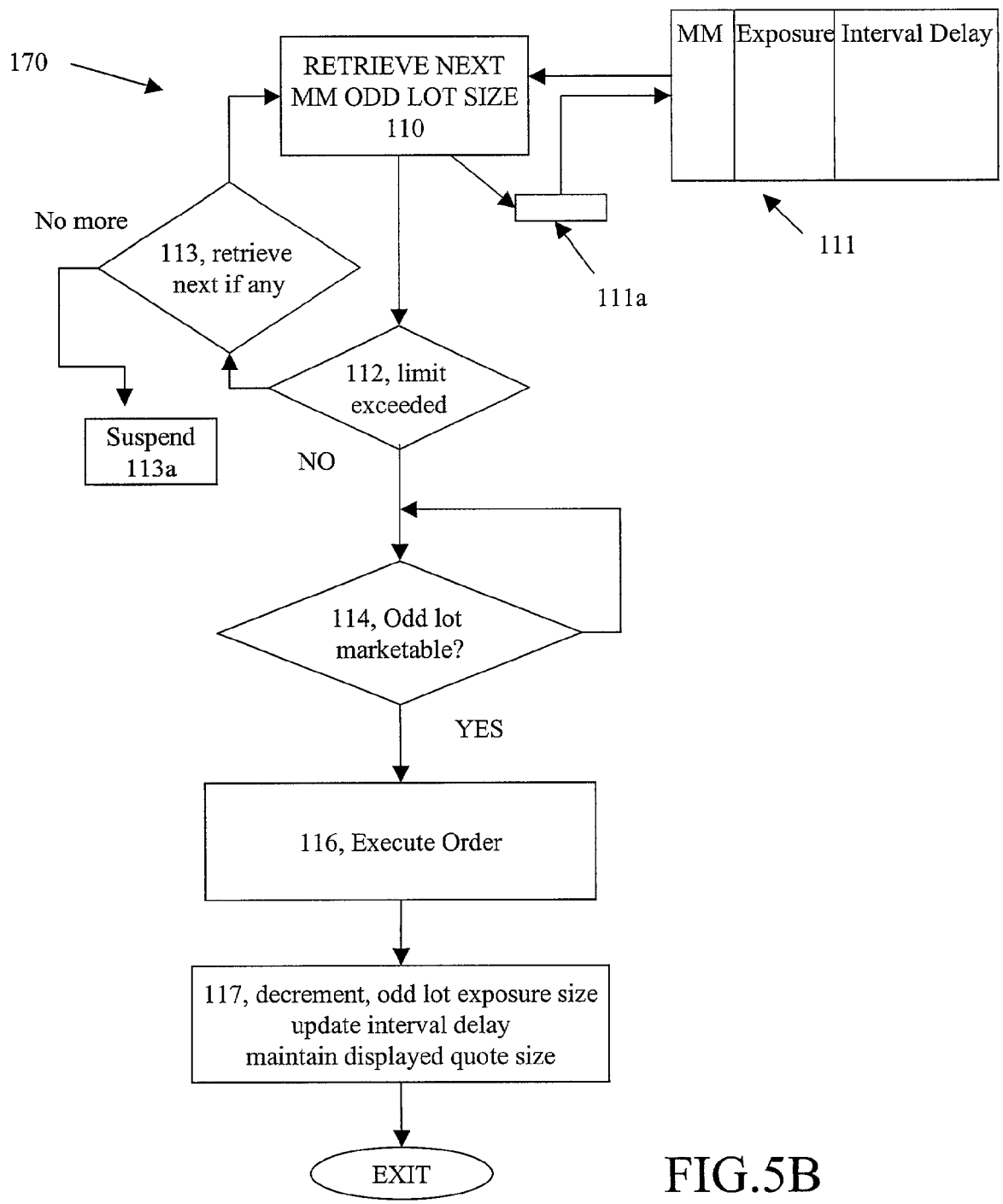

Referring to FIG. 5B, the odd-lot execution process 110 called by the odd-lot execution manager 26*g* is shown. The odd-lot execution manager 110 tracks (not shown) the odd-lot exposure limit that is set for each market maker in the particular security. In general, a market maker can and will maintain different exposure limits for each security that it makes a market in. In one embodiment, the exposure limit is set by the market maker. When a customer's odd-lot order is received by the odd-lot execution manager 26*g*, the odd-lot order is executed automatically against the next available market maker. To determine the next available market maker, the process retrieves 112 the next market maker (as determined by a pointer 111*a* to a queue 191 entry, or equivalent techniques) and determines 112 whether the next market maker is beyond the interval delay and has a remaining odd-lot exposure limit that can satisfy the order.

The process 110 can access the queue structure 111 at a point determined by the pointer 111*a*. The pointer 111*a* is updated during retrieving 120. The queue 111 stores the exposure limit and interval delay parameters for the market makers, and so forth. The process 110 determines 112 if the exposure is exceeded or there is no exposure. If the exposure is exceeded or there is no exposure, then the next market marker exposure limit is retrieved and tested if any 113 are left. If none are left then the odd-lot processing is suspended 113*a*. It remains suspended until a market maker refreshes its odd-lot exposure limit.

However, if the exposure is not exceeded then, when the odd-lot order becomes executable 114 (i.e., when the best price in the market moves to the price of the odd-lot limit order), the odd-lot order will execute 116 against the market maker (if not in the interval delay). Such odd-lot orders will execute 116 at the best price available in the market. Upon execution 116 the process will decrement the exposure limit for the market maker, update the time of execution and place the market maker at the bottom of the queue 111 (and is not in the interval delay).

Thus, the odd-lot execution manager 26g does not execute an odd-lot order against a market maker unless the market maker had a sufficient exposure limit to fill the odd-lot order. The odd-lot execution manager 26g decrements the exposure limit (not the quote or order sizes displayed in the quotation montage) by the size of the odd-lot order. When a market maker's odd-lot exposure is reduced to 0, the market maker is taken out of the odd-lot rotation unless and until the market maker sets a new exposure limit.

Despite the potential for odd-lot processing in a security to suspend if no market maker establishes an exposure limit, it is likely that competitive forces to capture and service this segment of the market will yield swift and robust processing of odd-lot transactions. Additionally, the use of the odd-lot process can result in such robust processing in other markets besides those that use market makers.

Thus, the order is executed in rotation against the market makers who have an exposure limit that would fill the odd-lot order. A market maker may, on a security-by-security basis, set an odd-lot exposure limit from 0 to a predefined number of shares, e.g., 999,999 shares.

For odd-lots that are part of a mixed lot, once the round-lot portion is executed, as discussed above the odd-lot portion will be executed at the round-lot price against the next market maker in rotation even if the round-lot price is no longer the best price in the market. Other arrangements are possible.

As mentioned, odd-lot executions will cause the odd-lot execution manager 26g to decrement the odd-lot exposure limit of a market maker. While, in some embodiments, the odd-lot execution manager will not decrement the market maker's displayed Quote/Order size upon execution of an odd-lot, in other embodiments the quote size can be decremented, when for example the number of odd lots executed equals one round lot.

After the odd-lot execution manager 26g has executed an odd-lot against a market maker, the system will not deliver another odd-lot order against the same market maker until a predetermined time period has elapsed from the time the last execution was delivered, as measured by the interval delay parameter as above. An exemplary value for this period of time is 5 seconds, but other time periods can be used.

Other embodiments are within the scope of the following claims.

What is claimed is:

1. A method for trading odd-lots of a security in an electronic market for trading securities, the method comprises:
    determining in a computer system whether an odd-lot exposure limit has been exceeded for a quoting market participant;
    routing a received odd-lot order for execution or delivery to the quoting market participant whose odd-lot exposure limit has not been exceeded and which is sufficient to satisfy execution of the order; and
    executing the order for quoting market participants that accept executions of orders or delivering the order for quoting market participants that accept deliveries of orders for execution.

2. The method of claim 1 further comprising:
    determining whether an interval delay between executions of odd-lots by a specified quoting market participants has been exceeded before routing a subsequently received odd-lot order for execution to the specified quoting market participant.

3. The method of claim 1 further comprising
    decrementing the odd-lot exposure limit for the quoting market participant against which the received odd-lot order was executed or delivered upon execution or delivery of the received odd-lot order.

4. The method of claim 1 wherein the electronic market maintains a displayable quote size for the quoting market participant for the security traded in the market.

5. The method of claim 1 wherein the displayable quote size for the quoting market participant in the security is not decremented in response to the quoting market participant satisfying the odd-lot order.

6. The method of claim 1 wherein the odd-lot order becomes executable when the price of the odd-lot order is at the best price in the market.

7. The method of claim 1 wherein the odd-lot exposure limit is specified for the security for each quoting market participant.

8. The method of claim 1 wherein the routing a received odd-lot order occurs in an odd-lot execution manager that is a separate mechanism for processing and executing orders distinct from a mechanism for processing normal units of trading.

9. The method of claim 1 further comprising:
    establishing an odd-lot order routing parameter of a predetermined number of orders per firm.

10. The method of claim 1 wherein, if the odd lot exposure limit has been exceeded, the method further comprises:
    determining the next available quoting market participant, by retrieving the next quoting market participant's odd-lot exposure limit and determining whether the next quoting market participant has a remaining odd-lot exposure limit that can satisfy the order.

11. The method of claim 1, further comprising:
    suspending processing of odd-lot orders for the security if the process determines that all exposure limits for all quoting market participant have been exceeded.

12. The method of claim 11 wherein the process remains suspended until a market maker refreshes its odd-lot exposure limit.

13. The method of claim 1 wherein a quoting market participant is a market maker or auto-execution electronic commerce network for executing the order or a electronic commerce network that takes deliveries of orders.

14. The method of claim 13 wherein the quoting market participant is a market maker, and the method further comprises:
    decrementing the exposure limit for the market maker, upon execution of the order and placing the market maker at the bottom of a queue.

15. The method of claim 14 wherein the process executes an odd-lot order against a market maker if the market maker has sufficient exposure limit to fill the odd-lot order.

16. The method of claim 1 further comprising:
determining if a order is a mixed lot order;
executing an odd-lot portion of the mixed lot using separate mechanism from the mechanism that executes a round lot portion of the mixed lot.

17. The method of claim 16 wherein the odd-lot portion is executed at the round-lot price against the next quoting market participant in rotation even if the round-lot price is no longer the best price in the market.

18. The method of claim 1, further comprising:
aggregating a number of odd lot executions for a particular security to produce an aggregate round lot execution comprised of odd-lot executions; and
decrementing an Quote/Order size upon execution of the aggregate round lot execution, when the number of odd lots executed equals a round lot.

19. An electronic market for trading securities, the market comprises:
a computing device;
a storage media for storing a computer program comprising instructions to cause the computing device to;
determine whether a received order is a mixed order or an odd order;
execute an odd-lot portion of the mixed order or the odd-lot order, with instructions to;
determine whether an odd-lot exposure limit has been exceeded for a quoting market participant; and
route a received odd-lot order for execution or delivery to the quoting market participant whose odd-lot exposure limit has not exceeded and which is sufficient to satisfy execution of the order.

20. The electronic market of claim 19 further comprising: instructions to:
determine whether an interval delay between executions of odd-lot or order lot portions of the mixed lot orders by a specified quoting market participant has been exceeded before routing a subsequently received odd-lot order or odd lot portion of a mixed lot order for execution to the specified quoting market participant.

21. The electronic market of claim 19 further comprising instructions to:
decrement the odd-lot exposure limit for the quoting market participant against which the received odd-lot or odd lot portion of the mixed lot order was executed or delivered upon execution or delivery of the received odd lot or odd lot portion of the mixed lot order.

22. The electronic market of claim 19 further comprising instructions to:
maintain a displayable quote size for the quoting market participant for the security traded in the market.

23. The electronic market of claim 22 wherein the displayable quote size for the market maker in the security is not decremented in response to the quoting market participant satisfying the odd-lot order or odd lot portion of the mixed lot order.

24. The electronic market of claim 19, further comprising instructions to:
suspend processing of odd-lot orders for the security if the odd-lot exposure has been exceeded for all quoting market participants.

25. The electronic market of claim 24 wherein the instructions to suspended maintains processing suspended until a quoting market participant refreshes its odd-lot exposure limit.

26. A computer program product residing on a computer readable medium for trading securities in an electronic market, comprises instructions for causing a computer to:
determine whether a received order is a mixed order or an odd lot order;
retrieve an odd-lot exposure limit for a next quoting market participant;
determine whether the odd-lot exposure limit has been exceeded for the next quoting market participant; and
repeating the instructions to retrieve and determine until the next quoting market participant whose odd-lot exposure limit was not exceeded is determined; and
route the received odd-lot order for execution or delivery to the quoting market participant whose odd-lot exposure limit has not been exceeded and which is sufficient to satisfy execution of the order.

27. The computer program product of claim 26 further comprising instructions to:
determine whether an interval delay between executions of odd-lot orders by a specified quoting market participant has been exceeded before routing a subsequently received odd-lot order for execution to the specified quoting market participant.

28. The computer program product of claim 26 further comprising instructions to:
decrement the odd-lot exposure limit for the quoting market participant against which the received odd-lot order was executed or delivered upon execution or delivery of the received order.

29. The computer program product of claim 26 further comprising instructions to:
maintain a displayable quote size for the quoting market participant for the security traded in the market and decrementing the displayable quote size for round lot executions by the quoting market participant, but whether the displayable quote size for the quoting market participant in the security is not decremented in response to the quoting market participant satisfying the odd-lot order.

30. The computer program product of claim 26 further comprising instructions to:
suspend processing of odd-lot orders for the security if the odd-lot exposure has been exceeded for all quoting market participants.

* * * * *